United States Patent [19]
Jablonsky

[11] 3,855,904
[45] Dec. 24, 1974

[54] AUXILIARY POWER STEERING SYSTEM

[75] Inventor: Erich Jablonsky, Bobingen/Rems, Germany

[73] Assignee: Zahnradfabrik Friedrichshafen AG, Friedrichshafen, Germany

[22] Filed: June 26, 1972

[21] Appl. No.: 266,053

[30] Foreign Application Priority Data
June 24, 1971 Germany............................ 2131276

[52] U.S. Cl..................................... 91/359, 91/372
[51] Int. Cl........................ F15b 13/16, F15b 9/10
[58] Field of Search ............... 91/359, 371, 372, 373

[56] References Cited
UNITED STATES PATENTS

| | | | |
|---|---|---|---|
| 2,893,504 | 7/1959 | Jackson | 91/371 |
| 2,917,026 | 12/1959 | Hall et al. | 91/359 |
| 2,936,739 | 5/1960 | Levensteins et al. | 91/371 |
| 2,979,068 | 4/1961 | Griswold et al. | 91/359 |
| 2,995,116 | 8/1961 | Dobbins | 91/359 |
| 3,772,962 | 11/1973 | Suzuki | 91/359 |

Primary Examiner—Paul E. Maslousky

[57] ABSTRACT

The invention provides a power boost steering system particularly for use in vehicles which have pressure storage reservoirs, such as accumulators, which provide pressure for various functions such as booster steering, brakes, and other accessories. The construction utilizes a double acting cylinder and valving means for pressurizing either end of the cylinder including road reaction means as part of the valving means to effect a resistance to the steering effort exerted by the operator. Such steering resistance is effected by a piston arrangement which utilizes the pressure in the valve means. In order to prevent the road reaction effect from becoming too strong, a force limiting means is combined with the valve means so that at a predetermined pressure in the road reaction arrangement, the force limiting means is actuated to aid the operator's effort.

12 Claims, 6 Drawing Figures

AUXILIARY POWER STEERING SYSTEM

In general where vehicle systems utilize a central pressure storage for steering, braking, suspension, regulation of level, etc., there are certain problems which arise due to the high pressure initially fed to the booster steering mechanism, which mechanism is under manual control. Thus in straight ahead driving, the valve which controls pressure to the double acting cylinder chambers must be cut off from the high pressure. However, the arrangement must be such that the vehicle wheels can automatically return into straight position after a turn has been made.

In present known arrangements there are certain drawbacks in central pressure storage usages, namely leakage when the valving is in neutral position with the wheels of the vehicle oriented for straight travel, and there is a loss of road sense or steering resistance as well as a certain amount of steering stiffness.

The present invention overcomes the above drawbacks by providing for connection through suitable valving of both ends of the servo cylinder to exhaust in straight ahead travel and likewise provides road resistance mechanism which is operative up to a certain predetermined degree of resistance. This is particularly useful in parking of a vehicle, with or without central pressure storage, and especially useful for booster power steering for vehicles with central pressure storage.

The overall construction provides a rotative steering control spindle having threaded connection with the piston in a double acting servo cylinder, the spindle having an enlarged portion which carries a control valve and road reaction components as well as mechanism for limiting the effect of the function of the road reaction components to a predetermined value in response to pressure in the valve. This limiting function is based on an arrangement of pistons and prestressed springs corresponding to about one-half the maximum pressure available in the central storage reservoir.

A detailed description of the invention now follows in conjunction with the appended drawing in which.

Figure 1:
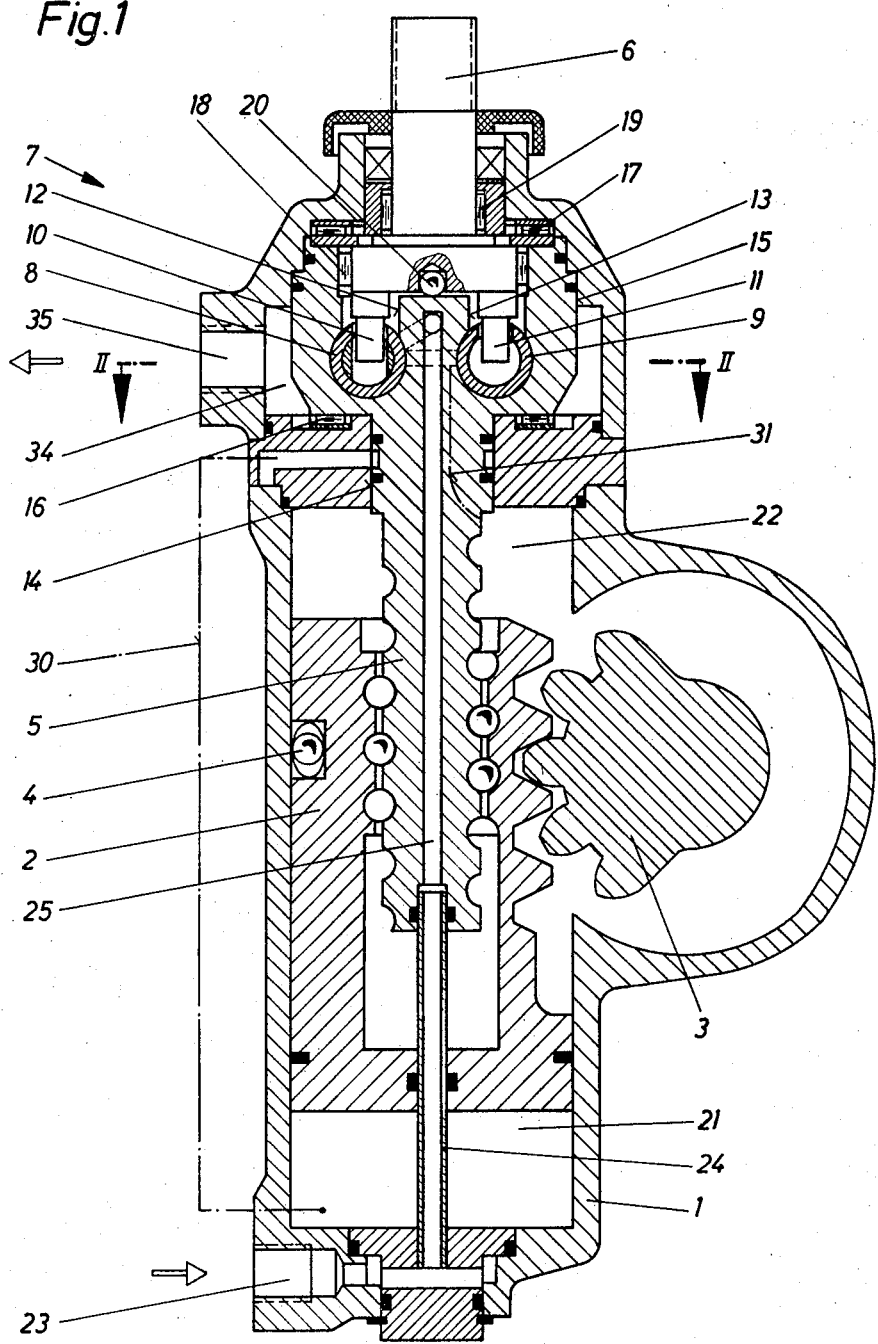
FIG. 1 is an elevation in section through a double acting servo cylinder showing certain components of the invention.
Figure 2:
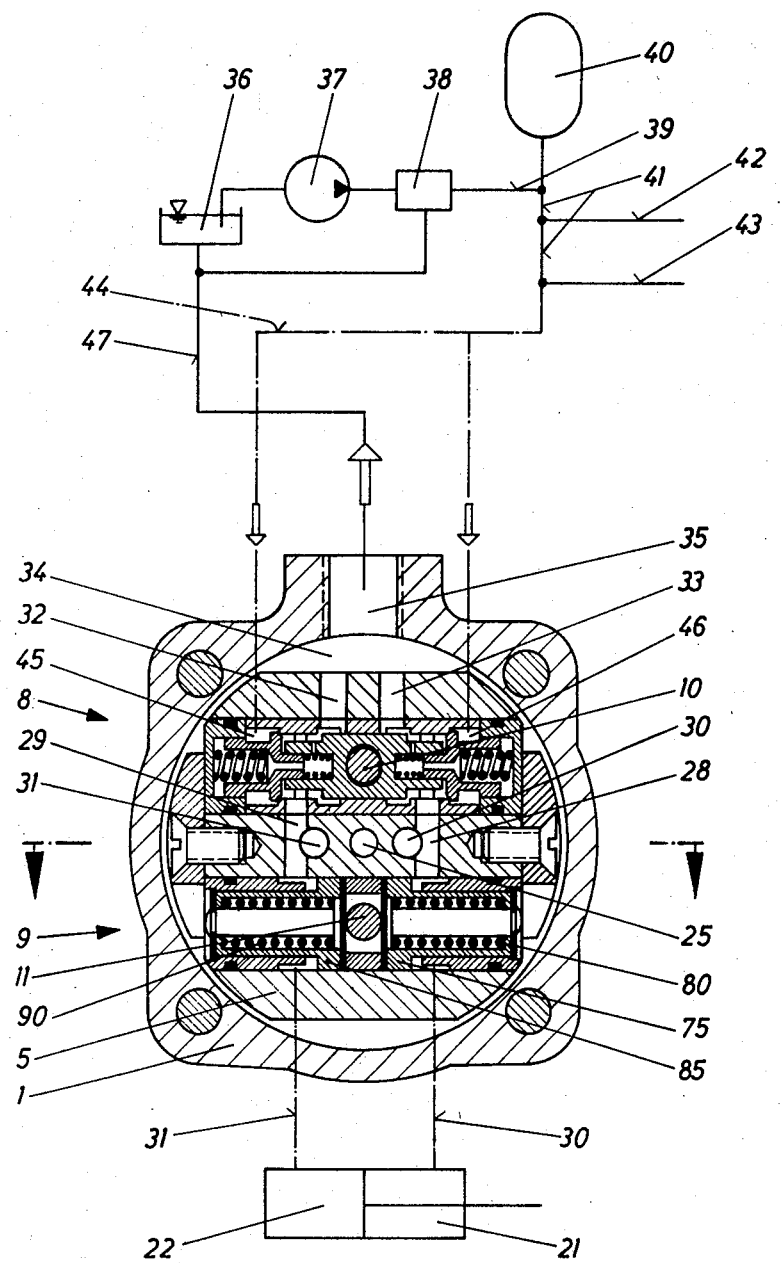
FIG. 2 is a section on the line II–II of FIG. 1, with additional diagrammatic material.

Referring to the drawing and particularly FIGS. 1 and 2, a steering gear housing 1 is shown effecting a generally conventional double acting booster steering servo cylinder having pressure operable piston 2 in the form of the usual steering nut, engaging a steering gear sector 3 via a rack and being reciprocable by a ball race 4 upon rotation of steering control spindle 5. Steering control spindle 5 is manually operable via the steering shaft 6 which will be understood to be connected to a steering wheel of a vehicle.

Figure 2A:
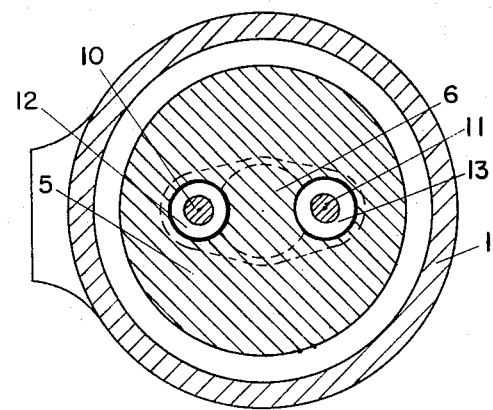
FIG. 2(a) is a sectional radial view to show the relationship of certain elements effecting lost motion.
Figure 4:
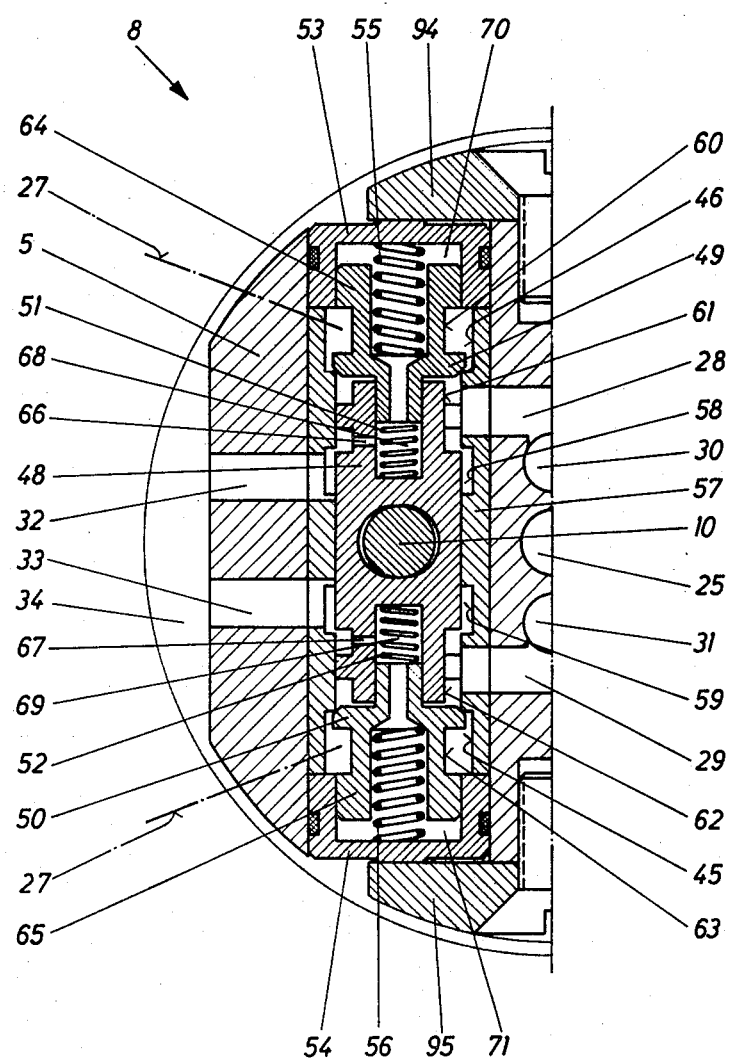
FIG. 4 is a longitudinal section through the valve assembly means of the invention.
Figure 5:
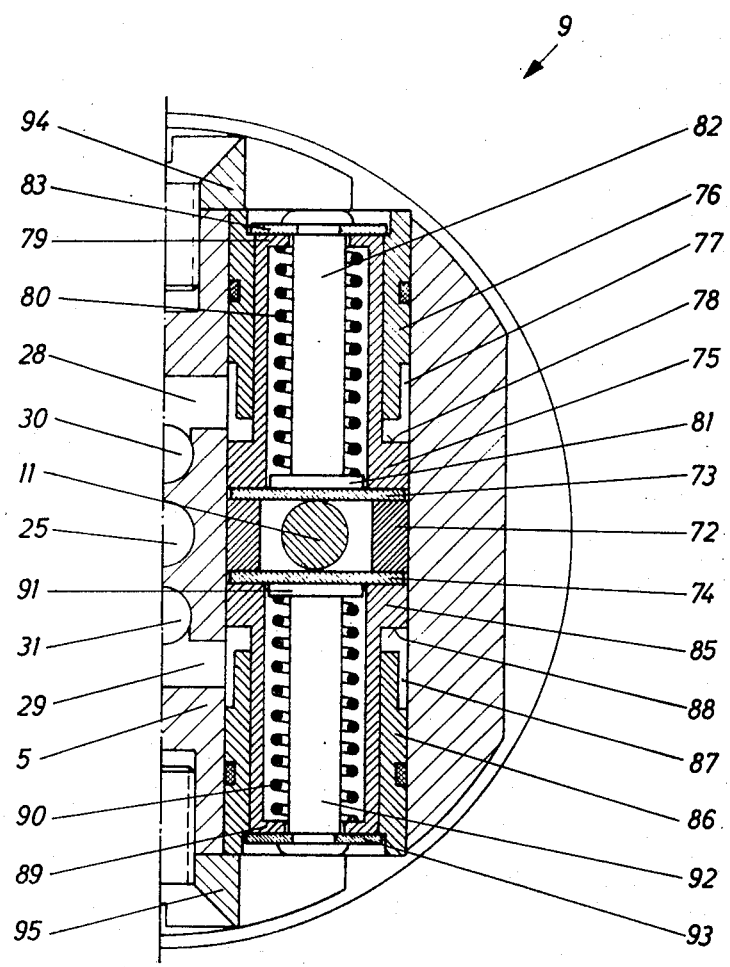
FIG. 5 is a longitudinal section through the road reaction force limiting means.

A valving control means and force control means assembly 7 is provided in the housing and comprises a steering control valve means 8 (also see FIG. 4) and a steering force limiting assembly 9 (also see FIG. 5). The manually controllable spindle 6 carries abutments such as pins 10 and 11 normally spaced from respective stop members 12 and 13 (FIG. 2a) carried by control spindle 5.

In general, and as will be explained in detail, when shaft 6 is rotated the pin 10 will rotate about the spindle 5 axis and operate the valve means 8, and then engage stop 12 to rotate spindle 5. The stops are devised so that either direction of rotation will have such effect, dependent on steering direction. Accordingly, piston 2 is then manually actuated via the ball race 4. Thus, pressure fluid is released to one chamber or the other via valve means 8, of the pressure chambers 21 and 22 of the servo cylinder divided by piston 2 into such chambers. Subsequently there is manual force supplied to the piston 2 via ball race 4. Or course, the pressure fluid force is far greater and is initially applied. On the other hand, pin 11 is acted on in either direction by the force limiting assembly 9 acting through stop 13 to aid in the manual effort under certain conditions of predetermined pressure, to overcome increase in simulated road resistance provided in valve means 8 and experienced by the operator. Initially, pin 11 is driven by manual force through stop 13 when stop 12 is driven, but can subsequently drive stop 13 to overcome excessive simulated road resistance.

Figure 3:
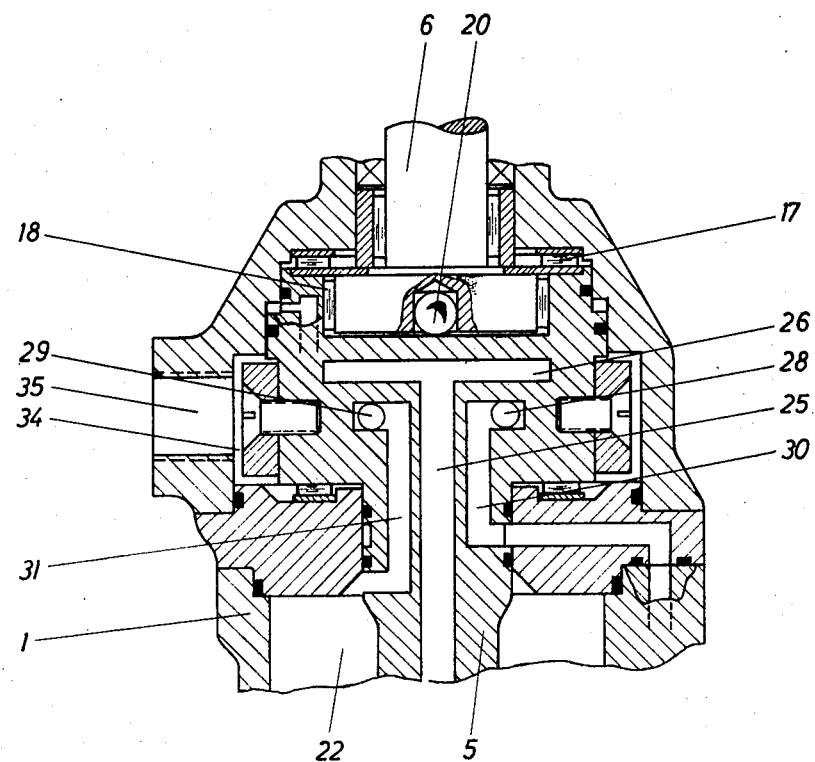
FIG. 3 is an enlarged detail of a portion of the passages from the valve assembly means to the pressure chambers of the servo cylinder, taken at right angles to the view of FIG. 1.

Referring particularly to FIGS. 1 and 3 the spindle 5 is mounted in radial friction bearings 14 and 15 and in axial needle bearings 16 and 17. Spindle 6 is mounted in two radial needle bearings 18 and 19 and is axially supported on a center bearing 20.

As hereinabove mentioned, the servo motor cylinder is divided by the piston into the pressure chambers 21 and 22 and hydraulic supply under pressure via valve menas 8 is furnished (FIG. 1) via a connection bore inlet port 23 communicating with a tube 24 secured at one end of the servo cylinder and having sliding guidance relative to piston 2 into a bore 25 through control spindle 5. Thus, the tube and spindle are coaxial but the tube does not rotate with the spindle, being suitably sealed in relation to both the piston and control spindle as shown. However, bore 25 communicates with a radial cross bore 26 (see FIG. 3) which connect with a pair of bores 27, each bore 27 feeding pressure to a respective end of control valve means 8 for respective cylinder chambers. Bores 27 are indicated by dash lines in FIG. 4 to show pressure in the regions designated.

As seen in FIGS. 2, 3 and 5, two bores 28 and 29 connect the steering control valve means 8 and the steering force limiting means 9 with each other.

As seen in FIGS. 2, 3, 4 and 5, and as shown by phantom lines in FIG. 1, bore 28 is also connected to the servo motor cylinder chamber 21 by means of a bore 30, and bore 29 is also connected with the opposite chamber 22 by means of a bore 31.

A pair of parallel bores 32 and 33 as seen in FIG. 2 connect from the steering control valve means 8 to an annular channel 34 which surrounds the entire assembly 7 (also see FIG. 1) and connects to an outlet port 35.

Referring particularly to FIG. 2, a servo pump 37 is illustrated symbolically for effecting pressure in hydraulic fluid from a tank 36 to an oil storage charging valve 38 and conduit 39 to a pressure reservoir or accumulator 40. Reservoir 40 connects via conduit 41 to secondary pressure devices, for example via conduit 42 to brakes and to an oil level regulator via conduit 43. Conduit 44, connecting to reservoir 40, provides pressure input to the inlet port 23 (FIG. 1) and is shown in double phantom lines to indicate connection to bores 27 (FIGS. 1 and 4) which communicate with respective annular grooves 45–63 and 46–60 of the valve assembly 8 as seen in FIG. 4. Owing to the presence of pressure reservoir 40, these grooves must be closed when the steering control valve is, in neutral position for straight head steering, i.e., no flow of pressure fluid takes place through the valve assembly 8 until steering is actually effected by rotation of shaft 6. When shaft 6 is rotated to effect steering of a vehicle, the steering control valve 8 means and the steering force limiting device 9 become operative and are mechanically actuated in opposite directions by the respective pins 10 and 11 carried by shaft 6, as heretofore generally discussed.

Still referring to FIG. 2, and as will be clearly understood from the specific description which follows, both ends of the servo cylinder, that is the pressure chambers 21 and 22, communicate through the valve means 8 to exhaust in neutral position of the valve means.

Thus, the pressure chambers are pressureless in neutral position but flow between the chambers can take place in either direction so that the vehicle wheels are not locked in the straight ahead position, it will likewise be noted that feed pressure, i.e., operating pressure, exists only in the grooved region around the bodies of the spring biased conical valves 49 and 50 (FIG. 4) which pressure is blocked by those valves until one or the other of the valves is actuated.

From FIGS. 1, 2 and 4 it will be understood that servo motor chamber 21 can be pressurized or exhausted through a respective bore 30 and chamber 22 can be pressurized or exhausted by the respective bore 31. The exhaust fluid from chamber 21 is fed via bore 32 to annular channel 34, outlet 35 and conduit 47 to tank 36. Exhaust from chamber 22 passes through bore 31 to channel 34. Selection of which pressure chamber of the servo motor is pressurized is, of course, a matter of direction of the rotation of shaft 6 to effect a respective direction of linear movement of valve assembly 8, to effect movement of certain respective valve elements for control of chambers 21 and 22, as will be explained. Thus, pin 10 extends into an elliptical bore of a piston valve 48 to slidably move that valve in either direction upon rotation of shaft 6.

With particular reference to FIG. 4, the valve assembly 8 comprises the piston valve 48 within a relatively fixed valve sleeve 57 carried within the enlarged head of the steering control spindle 5 and integrally secured therein for rotation therewith as by bolted members 94 and 95 clamping against respective closure caps 53 and 54, the bolts being threaded into the body of the enlargement as will be very readily understood from FIGS. 2 and 4.

The piston valve 48 can reciprocate within valve sleeve 57 in either linear direction driven by pin 10. Each end of the piston valve 48 has slight clearance from a respective spring biased conical valve 49 or 50. Thus, such clearance is shown as between the ends of valve 48 and the conical valve heads in FIG. 4 The conical valves are spring biased to engage respective valve seat shoulders within valve sleeve 57. Spring 55 biases valve 49 and spring 56 biases valve 50. Springs 51 and 52 serve to center the piston valve 48 with respect to the conical valves 49 and 50 in sleeve 57 in coaction with springs 55 and 56. Accordingly, a completely symmetrical and balanced mechanical valve assembly is effected.

The clearance described above ensures automatic centering of valve 48 by action of springs 51 and 52 and avoids initial simulated road resistance, as well as effecting exhaust cut off before pressurizing either cylinder chamber.

Since the pump 37 is in continuous operation there is continuous fluid pressure from storage reservoir 40 and circulation of fluid throughout the composite valve assembly 8 and the chambers 21 and 22 of the servo cylinder are maintained filled with fluid with connection for flow therebetween through the valve assembly in neutral position. This not only holds the vehicle wheels for straight ahead steering, but in the event of the release of the steering wheel by the operator, after a turn, automatically straightens the wheels for straight ahead travel.

The valve sleeve 57 is provided with annular grooves 45, 46, 58 and 59 which coact with opposing respective grooves 60, 61, 62 and 63 provided in piston valve 48 and in conical valves 49 and 50. As seen on FIG. 4, grooves 60 and 63 are provided in the respective conical valves while grooves 61 and 62 are provided at the ends of the piston valve. FIG. 4 shows a neutral position for connecting the chambers of the servo cylinder via bores 30 and 31 to exhaust via bores 32 and 33.

The conical valves 49 and 50 have road reaction piston portions 64 and 65, respectively, having faces exposed in respective chambers 70 and 71 of closure caps 53 and 54. The effective diameters of the valve heads and systems are such that a differential pressure effect is achieved, which in conjunction with springs 55 and 56, hold the conical valve heads in the seated position shown. Thus, the effective diameters of the reaction pistons are smaller than the seating diameters of the valve heads, pressure being present via bores 27 into the space between piston portions and respective valve heads.

To provide road feel, pressure is introduced to the respective chambers 70 and 71 (FIG. 4) by way of the grooves 61 and 62, wherein piston valve 48 has respective radial bores 66 and 67 leading to respective axial bores 68 and 69 for conducting fluid through the axial passages shown in the respective chambers 70 and 71.

Accordingly, (FIG. 4) it will be seen that the slight clearance, for example, between collar 61 and the conical head of valve 49 will be quickly taken up upon movement of piston valve 48 by pin 10 in an upward (actually clockwise) direction, and after that the piston valve will be working against pressure in chamber 70. Obviously, a reverse direction of the piston valve produces an opposite effect, the reaction force in either case being ultimately transmitted to the vehicle operator via steering shaft 6.

For a turn in one direction assuming pin 10 is rotated about the axis of steering spindle 5 clockwise (as viewed in FIG. 2) there is cutoff at groove 58 of exhaust from chamber 21 by piston valve 48 moving upwardly as seen in FIG. 4 which opens valve 49. Pressure fluid flows via 23–24–25–26–27–46–60–61–28–30 to chamber 21. Piston 2 moves to exhaust chamber 22 via the communication passages shown in FIG. 4, i.e., 31–29–62–59–33–34.

For steering in the opposite direction the effect is functionally symmetrical in that exhaust from chamber 22 is cut off at groove 59 upon movement of piston valve 48 downwardly as seen in FIG. 4 and pressure fluid then passes through the then open conical valve 50 from bore 27, grooves 45, 63, 62 into bore 29 and bore 31 to chamber 22. Exhaust for chamber 21 is as shown by the communicating passages in FIG. 4, i.e., 30–28–61–58–32–34.

Referring to FIG. 5, the steering force limiting assembly 9 comprising pistons and biasing springs is devised so that the steering effort has a predetermined limit for parking or turning the vehicle wheels in a steering function or when a high pressure storage reservoir is used.

The pin 11 passes through a ring 72 which is suitably provided with a bore for such purpose. Ring 72 effects a slidable guide in a supporting bore of the housing for the mechanical components and has respective side discs 73 and 74 which engage the inner faces of respective pistons 75 and 85. These pistons are axially movable in respective sleeves 76 and 86 locked by members 94 and 95, respectively. Each sleeve has a respective annular groove 77 and 87 at its inner end, communicating for pressure fluid via respective bores 28 and 29 with respective valves 49 and 50. The pistons 75 and 85 have pressure areas, respective surfaces 78 and 88.

The ends of the pistons are formed with respective turned in collars 79 and 89, having external respective closure plates 83 and 93 in the form of discs to which are securely fastened respective bolts 82 and 92. Around each bolt there is a respective spring 80 and 90 which springs are compressed between the respective collars 79 and 89 and respective flanges 81 and 91 at the ends of the bolts. The prestressed compression in the springs 80 and 90 is set so as to yield at the highest steering resistance desired for normal steering operation or parking.

With a reservoir pressure $P_v$ for the system acting on either piston areas 78 or 88, the prestress in spring 80 and 90 would be such as to yield at approximately one half total pressure fluid force.

Thus, the grooves 77 and 87 connect with bores 30 and 31 and would therefore, be subjected to the pressure existing in these bores depending upon which bore is pressurized, in turn depending upon direction of steering selected. Accordingly, the pressure, for example, in bore 28 would be directly transmitted to the piston area 78 from valve 49 which would cause piston 75 to move downwardly (FIG. 5) to exert a force on pin 11 through disc 73 provided that the prestress compression of spring 80 is overcome. The force on pin 11 is opposite to the direction of road reaction force acting against pin 10 caused by reaction piston 64. The road resistance effect is thus overcome at some predetermined reaction force effect of piston portion 64. Obviously, for steering in an opposite direction where the pressure is transmitted to the surface 88, the opposite limiting force effect of road resistance is achieved.

From the preceding it will be appreciated that, if, during parking the operating pressure passes a maximum value and thus effects an increase in the reaction force beyond that which is desirable, then the force limiting device 9 in response to overpowering the prestress compression in spring 80 or 90 delivers a force directed against the reaction force, which compensates for any further increase of the reaction force and which thus makes parking easier. Further, such compensating force can be effected under any driving conditions where simulated road resistance effected by the valve means 8 may reach an undesirable degree. Predetermining the point at which cut out of increased simulated road resistance by applying a force against such increase is, of course, a matter of choice and design for springs 80 and 90 and the operating surfaces 78 and 88 of pistons 75 and 85.

What is claimed is:

1. In a booster power steering system utilizing a pressure storage reservoir as a pressure fluid source, the combination which comprises a double acting servo cylinder having a reciprocal piston therein and a servo cylinder pressure chamber at each end of said piston; manually operable valve means and flow passage means for connecting said storage reservoir to said chambers to selectively pressurize either of said chambers with operating pressure from said reservoir; said valve means having road reaction means for effecting simulated steering resistance; and force limiting means for overcoming said simulated steering resistance at a predetermined limit thereof responsive to operating pressure in said valve means; said valve means comprising a respective valve for each pressure chamber; said road reaction means comprising each said valve having a piston portion and a chamber and flow passage means whereby said chambers receive said operating pressure to act against the respective valve in a direction opposite to the opening direction thereof for effecting simulated steering resistance; said force limiting means comprising respective pressure operated pistons and flow passage means whereby said pistons are exposed to operating pressure controlled by each said valve; a respective prestressed spring against which each said pressure operable piston is movable in response to a predetermined pressure, and abutment means movable by an operator for opening either of said valves to pressurize a respective chamber and disposed to be actuated by either of said pressure operated pistons of said force limiting means in a direction to aid valve opening upon said predetermined pressure acting on either of said pistons.

2. In a booster power steering system as set forth in claim 1, said valve means comprising a piston valve operable by said abutment means to selectively open either of said valves and flow conducting passages for pressure feed to said valves whereby opening one of said valves effects pressure feed to said piston valve and thence to respective servo cylinder chambers; including additional flow passages from said piston valve for exhaust from either of said chambers when the other chamber is pressurized;

said abutment means engaging said piston valve for movement thereof;

wherein one said valve is disposed to be engaged to be opened by movement of said piston valve in one direction and the other said valve is disposed to be engaged by movement of said piston valve in the other direction.

3. In a booster power steering system as set forth in claim 2, each said valve having a valve head, and a steering control spindle having a sleeve fixed therein and having valve seats against which respective valve heads seat in opposite directions;

respective springs for effecting seating of said valve heads; said piston valve being intermediate said valves for actuating engagement thereof upon movement of said piston valve;

means carried by said steering control spindle to be engaged by said abutment means so as to be rotated thereby;

and means intermediate said steering control spindle and said piston for actuating said piston upon rotation of said spindle.

4. In a booster power steering system as set forth in claim 3;

a cap member at each end of said sleeve effecting a respective chamber of said road reaction means, the said piston portions of said valves being disposed therein;

said valve heads having effective areas less than the effective areas of respective piston portions whereby a closing biasing force is effected on said valves;

said valve means flow passage means comprising grooves in respective valve bodies intermediate the valve head and piston portion of each valve and connected to operating pressure whereby said biasing closing force is effected for each said valve and whereby said operating pressure is available for steering control in said valve means.

5. In a booster steering system as set forth in claim 4, said flow passage means comprising said sleeve and said piston valve having respective grooves coacting with respective grooves in said valves to effect flow passages when said piston valve is actuated to open one of said valves;

said flow passage means further comprising passages in said steering control spindle communicating through said valve grooves to conduct flow to and from said servo cylinder pressure chambers for supply and exhaust of pressure fluid.

6. In a booster steering system as set forth in claim 4, said piston valve having end bores and each said valve having a hollow tubular extension slidable in a respective end bore, and effecting communication with the respective road reaction means chamber;

a respective passage through said piston valve from each said end bore to the exterior of said piston valve and communicating via passages of said flow passage means to receive operating pressure when a respective valve is open for pressurizing respective road reaction chambers.

7. In a booster steering system as set forth in claim 3, said valve heads being conical.

8. In a booster steering system as set forth in claim 3, said piston valve having end bores;

each said valve having a hollow tubular extension slidably extending into a respective end bore of said piston valve and a spring in each bore bearing against the respective extension.

9. In a booster power steering system utilizing a pressure storage reservoir as a pressure fluid source, the combination which comprises a double acting servo cylinder having a reciprocal piston therein and a servo cylinder pressure chamber at each end of said piston; manually operable valve means and flow passage means for connecting said storage reservoir to said chambers to selectively pressurize either of said chambers with operating pressure from said reservoir; said valve means having road reaction means for effecting simulated steering resistance; and force limiting means for overcoming said simulated steering resistance at a predetermined limit thereof responsive to operating pressure in said valve means; a control valve spindle having a pair of parallel bores; said valve means being disposed in one said bore and said force limiting means being disposed in the other of said bores; each said latter means having components for reciprocal motion; said manually operable means comprising a steering shaft having a pair of abutment pins wherein one said pin engages the reciprocal components of said valve means for operation thereof and the other said pin engages the reciprocal components of said force limiting means to be acted against thereby in a direction to aid the application of manual force.

10. In a booster steering system as set forth in claim 8, including flow passages intermediate said valve means and said force limiting means;

said force limiting means having pressure operable pistons for respective directions of force application and disposed to be pressurized by the pressure in said valve means;

prestressed springs for respective pistons to maintain said pistons against effecting aid until pressure thereon overcomes the degree of prestress in respective springs;

wherein the functioning of said pistons occurs at less than operating pressure in said valve means, predetermined by the degree of spring prestress and the effective area of said pistons.

11. In a booster power steering system utilizing a pressure storage reservoir as a pressure fluid source, the combination which comprises a double acting servo cylinder having a reciprocal piston therein and a servo cylinder pressure chamber at each end of said piston; manually operable valve means and flow passage means for connecting said storage reservoir to said chambers to selectively pressurize either of said chambers with operating pressure from said reservoir; said valve means having road reaction means for effecting simulated steering resistance; and force limiting means for overcoming said simulated steering resistance at a predetermined limit thereof responsive to operating pressure in said valve means; said valve means comprising a pair of valves for respective steering directions; and further comprising a piston valve engageable at its ends with a respective valve for opening thereof and being connected with said manually operable means for actuation; said flow passage means comprising passages for pressure fluid to said valves and passages for communicating pressure fluid from either said valves to said piston valve and passages from said piston valve to each said pressure chamber for pressurizing either pressure chamber of said servo cylinder while the other said pressure chamber is being exhausted; and a clearance intermediate the ends of said piston valve and the respective valves to delay pressurizing of either chamber until exhaust communication from that chamber is cut off; said piston valve being normally positioned so that both pressure chambers are pressureless and connected to exhaust whereby flow may take place between chambers; said flow passage means including passages controlled by said piston valve for effecting simultaneous exhaust communication for said pressure chambers.

12. In a booster power steering system utilizing a pressure storage reservoir as a pressure fluid source, the combination which comprises a double acting servo cylinder having a reciprocal piston therein and a servo cylinder pressure chamber at each end of said piston; manually operable valve means and flow passage means for connecting said storage reservoir to said chambers to selectively pressurize either of said chambers with operating pressure from said reservoir; said valve means having road reaction means for effecting simulated steering resistance; and force limiting means for overcoming said simulated steering resistance at a predetermined limit thereof responsive to operating pressure in said valve means; said force limiting means comprising a pair of axially aligned pistons and a prestressed spring in each piston compressible thereby; said abutment means comprising a member intermediate said springs actuatable by either piston upon a predetermined pressure being exerted thereon; and passage means connecting said valve means with said pistons for communicating operating pressure thereto.

* * * * *